United States Patent
Nakagome et al.

(10) Patent No.: US 7,361,201 B2
(45) Date of Patent: Apr. 22, 2008

(54) AIR CLEANER DEVICE

(75) Inventors: Hiroshi Nakagome, Saitama (JP);
Akihiro Hamada, Saitama (JP);
Katsuyuki Konishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 10/978,372

(22) Filed: Nov. 2, 2004

(65) Prior Publication Data
US 2005/0120686 A1 Jun. 9, 2005

(30) Foreign Application Priority Data
Nov. 6, 2003 (JP) ............... 2003-376953

(51) Int. Cl.
*B01D 35/30* (2006.01)
*F02M 35/10* (2006.01)
*F01P 7/10* (2006.01)

(52) U.S. Cl. ............... 55/385.3; 123/184.31; 123/198 E; 123/184.32; 123/579; 180/68.1; 180/219; 55/418; 55/498

(58) Field of Classification Search ............... 55/385.3, 55/418, 498; 123/184.31, 198 E, 184.32, 123/579; 180/68.1, 219
See application file for complete search history.

(56) References Cited

U.S. PATENT DOCUMENTS 6,162,271 A * 12/2000 Bullinger et al. .......... 55/385.3
6,540,806 B2 * 4/2003 Reinhold .................... 55/490
6,716,264 B2 * 4/2004 Onoda ...................... 55/385.3
7,094,267 B2 * 8/2006 Inayama ................... 55/385.3
2006/0230728 A1 * 10/2006 Tsuruta et al. ............ 55/385.3

FOREIGN PATENT DOCUMENTS

JP 2002-160686 A 6/2002

* cited by examiner

*Primary Examiner*—Duane Smith
*Assistant Examiner*—Minh-Chau T. Pham
(74) *Attorney, Agent, or Firm*—Birch, Stewart, Kolasch & Birch, LLP

(57) ABSTRACT

An air cleaner device for exchanging an element without permitting dust and dirt collected between the element and an air guide member in a clean side to fall and for smoothly permitting intake air to be supplied to the engine. An air cleaner device includes a cylindrical element with an air guide member including a guide sleeve formed into a diameter smaller than an inner diameter between element inner walls of the element which are served for inserting the air guide member from one end of the element and flange portions which are formed on the guide sleeve to be brought into contact with one end surface of the element. A cleaner case houses the element and the air guide member and an air intake duct portion which is mounted on a lower portion of the cleaner case and is arranged below the air guide member.

19 Claims, 6 Drawing Sheets

AIR CLEANER DEVICE

CROSS-REFERENCE TO RELATED APPLICATIONS

The present non-provisional application claims priority under 35 USC 119 to Japanese Patent Application No. 2003-376953 filed on Nov. 6, 2003 the entire contents thereof is hereby incorporated by reference.

FIELD OF THE INVENTION

The present invention relates to an air cleaner device for a motorcycle.

DESCRIPTION OF BACKGROUND ART

An air cleaner device for a motorcycle is a device for removing dust and dirt in the air which is taken into an engine and for reducing the intake sound of the engine.

A conventional air cleaner device for a motorcycle that is mounted above an engine is disclosed in JP-A-2002-160686, page 3, FIG. 4.

FIGS. 6(a) and 6(b) in the drawings are views for explaining the basic principle of the prior art. As illustrated in FIG. 6(a) the air cleaner device 100 includes a cap 102 of a cleaner box 101 with a bottom surface 103, a ventilation sleeve 104 formed on the bottom surface 103 and filters 105, 105 which are mounted on the ventilation sleeve 104 from above in a state wherein the filters 105, 105 surround the ventilation sleeve 104. An inlet portion 106 constitutes an inlet allowing air to flow into the ventilation sleeve 104. An outlet portion 107 constitutes an outlet for allowing the air which passes through the filter 105 to flow into the engine side.

Outside air enters through an inlet portion 106 and passes through the filters 105, 105 as indicated by an arrow. Dust and dirt 108 which enter inside the air cleaner device 100 are collected between the ventilation sleeve 104 and the filters 105, 105.

FIG. 6(b) is an operational view showing the manner of exchanging the filters 105, 105, wherein when the filters 105, 105 are removed from the bottom surface 103, the dust and dirt 108 which are collected between the ventilation sleeve 104 and the filters 105, 105 flow out to the clean side along the bottom surface 103 as indicated by lateral arrows.

In this manner, in the prior art, since the filter 105 (hereinafter referred to as an "element" including the filter 105) and the ventilation sleeve 104 (hereinafter referred to as an "air guide member") are constituted as separate members from each other, when the element is removed at the time of exchanging the element, the dust and dirt 108 fall into the clean side of a cleaner box 101 (hereinafter referred to as a "cleaner case") in a spreading manner. Thus, it is necessary to clean the inside of the cleaner case before mounting the new element.

SUMMARY AND OBJECTS OF THE INVENTION

In one embodiment of the present invention an air cleaner device is provided which can exchange an element while preventing dust and dirt which are collected between the element and the air guide member from falling to a clean side and, at the same time, can ensure a smooth intake of air.

One embodiment of the present invention is directed to an air cleaner device having a cylindrical element with an air guide member which includes a guide sleeve having a diameter smaller than an inner diameter of the element which is served for inserting the air guide member from one end of the element. Flange portions are provided which are formed on the guide sleeve to be brought into contact with one end surface of the element. A cleaner case houses the element and the air guide member so that the air guide member is coupled to the element.

One embodiment of the present invention is directed to the air guide member which is integrally formed with the element at the time of detaching the element from the cleaner case and is separably coupled to the element when the air guide member is removed from the cleaner case.

One embodiment of the present invention is directed to an air intake duct portion having an axis which is inclined with respect to an axis of the element that is attached to the cleaner case. An inlet of the guide sleeve defines an inclined surface which is inclined in the same direction as the air intake duct portion.

In the present invention the air guide member may be mounted in the inside of the cleaner case which is coupled with the element.

As a result, it is possible to obtain an advantageous in that, at the time of exchanging the element, dust and dirt or the like which are adhered to or are collected between the element and the air guide member can be taken out together with the element.

In the present invention, the air guide member may be configured to be separable from the element when the air guide member is removed form the cleaner case.

With respect to the element and the air guide member, the element is separated from the air guide member and is discarded, while only the air guide member is cleaned and can be coupled with a new element.

As a result, it is sufficient to perform only the cleaning of the dust and dirt collected in the guide sleeve and the flange portion of the air guide member and hence, it is possible to obtain an advantageous effect in that the cleaning is facilitated.

In the present invention, the air intake duct portion includes an inclined axis with respect to an axis of the element that is attached to the cleaner case thus imparting an inclined surface to an inlet of the guide sleeve in the same direction as the air intake duct portion.

As a result, it is possible to smoothly introduce air from the air intake duct portion and the inlet of the guide sleeve to the inside of the air cleaner device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
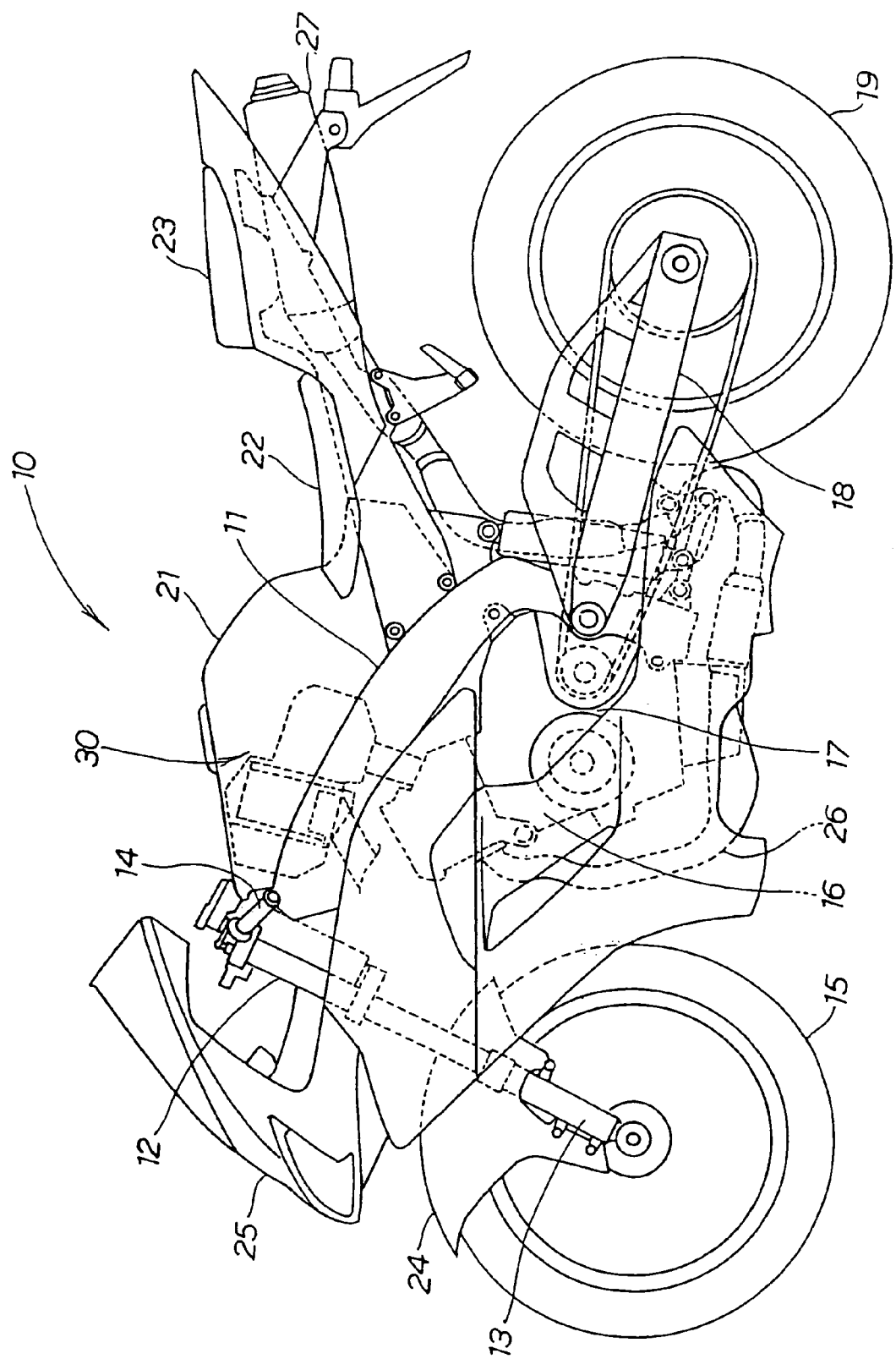
FIG. 1 is a side view showing a motorcycle provided with an air cleaner device according to the present invention.

Hereinafter, a best mode for carrying out the invention is explained in conjunction with drawings. FIG. 1 is a side view of a motorcycle provided with an air cleaner of the present invention. A motorcycle 10 includes a main frame 11, a front fork 13 and a handle 14 which are mounted on a steering shaft which is rotatably mounted on a head pipe 12 formed on a front end of the main frame 11. A front wheel 15 is mounted on a lower end portion of the front fork 13. An engine 16 is mounted on a lower portion of the main frame 11 with a transmission 17 which is integrally formed on a rear portion of the engine 16. A swing arm 18 is mounted on a rear portion of the main frame 11 with a rear wheel 19 is mounted on a rear end portion of the swing arm 18. A fuel tank 21 is mounted on an upper portion of the main frame 11 with a seat 22 being mounted on a rear portion of the fuel tank 21. A fellow passenger seat 23 is mounted on a rear portion of the seat 22.

The air cleaner device 30 is a device which is arranged behind the head pipe 12 and the handle 14 and above the engine 16. The air cleaner device 30 removes dust and dirt in air to prevent the dust and dirt to be taken into the engine during operation of the motorcycle and reduces an air intake sound of the engine.

A front fender 24 covers a front wheel 15 with an upper cowl 25 being mounted adjacent thereto. An exhaust pipe 26 extends rearwardly from the engine 16 with a muffler 27 connected to the exhaust pipe 26.

Figure 2:
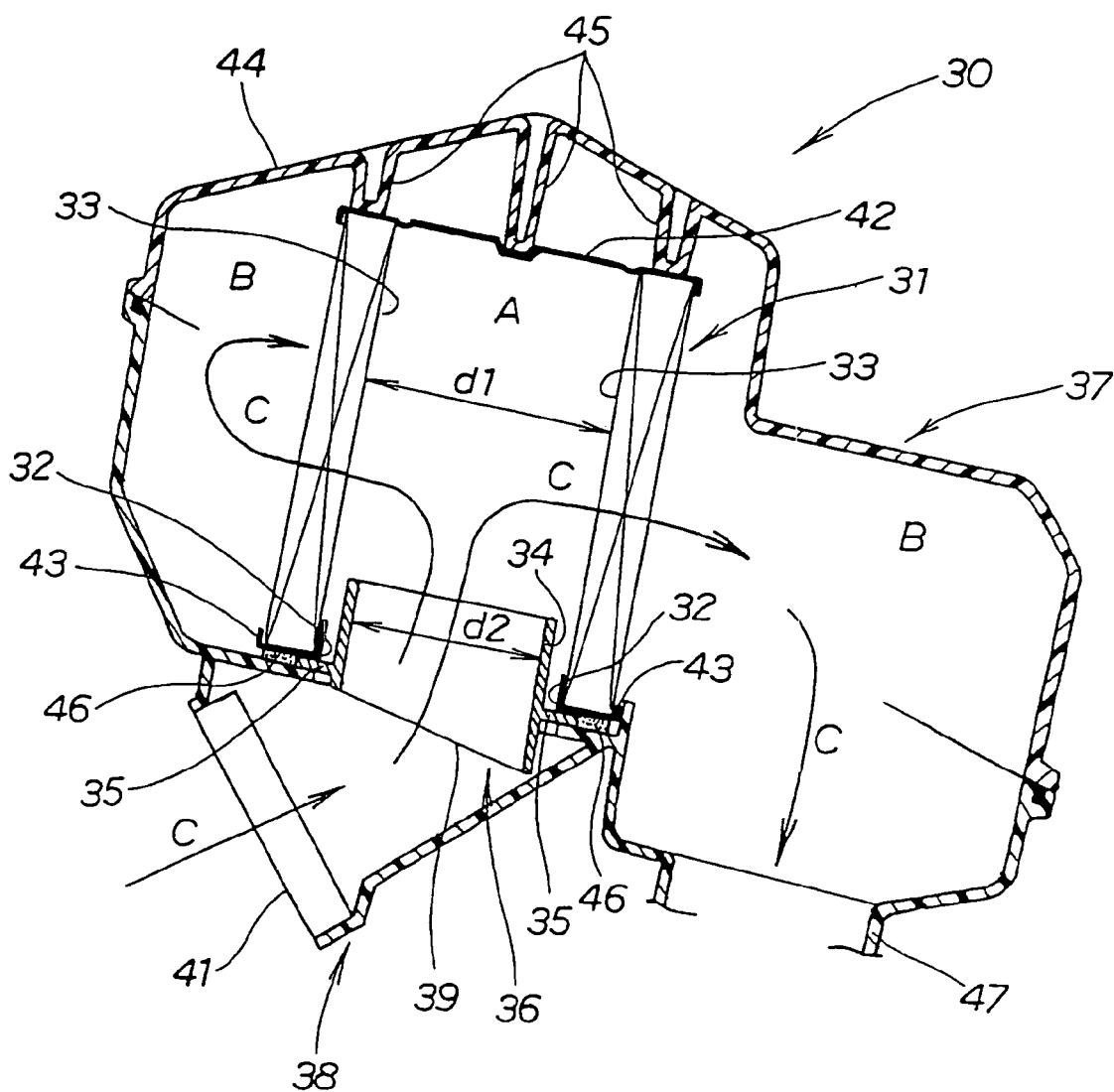
FIG. 2 is a side view of the air cleaner device according to the present invention.

FIG. 2 is a side view of the air cleaner device according to an embodiment of the present invention, wherein the air cleaner device 30 is the structural body which includes a cylindrical element 31. An air guide member 36 includes a guide sleeve 34 which is formed into a diameter d2 that is smaller than an inner diameter d1 between element inner walls 33, 33 of the element 31 which are served for inserting the air guide member 36 from one end 32 of the element 31. Flange portions 35, 35 are formed on the guide sleeve 34 to be brought into contact with one end surface of the element 31. A cleaner case 37 houses the element 31 and the air guide member 36. An air intake duct portion 38 is mounted on a lower portion of the cleaner case 37 and is arranged below the air guide member 36. Thus, the air guide member 36 is coupled to the element 31 to form an integral body.

Although the air guide member 36 is integrally formed with the element 31 at the time of detaching the element 31 from the cleaner case 37, when the element 31 is removed from the cleaner case 37, the air guide member 36 is separable from the element 31.

In attaching the air intake duct portion 38 having an axis inclined with respect to an axis of the element 31 to the cleaner case 37, an inlet 39 of the guide sleeve defines an inclined surface which is inclined in the same direction as the air intake duct portion 38.

That is, the inlet 39 of the guide sleeve and the inclined portion 41 of the air intake duct portion 38 are inclined surfaces which are inclined in the same direction.

An element upper lid 42 is provided with an element lower lid 43 with an upper lid 44 of the cleaner case 37. An element pushing portion 45 is provided together with a cushion 46. An air intake duct portion 47 is operatively connected thereto.

In the element 31, the element upper lid 42 is pushed by the element pushing portion 45 disposed above the cleaner case 37 and the cushions 46, 46 are interposed on both sides of the flange portions 35, 35 of the air guide member 36 which is coupled to ends 32, 32 of the element lower lid 43 whereby the element upper lid 42 is surely fixed in the inside of the cleaner case 37 due to the elasticity of the cushions 46, 46.

Air enters from the inclined portion 41 of the air intake duct portion 38 as indicated by an arrow C, then enters a dirty side A in the inside of the element 31 through the inlet 39 of the guide sleeve of the air guide member 36 and, thereafter, passes through a clean side B, and then enters the engine side from the air intake duct portion 47.

Figure 3A:
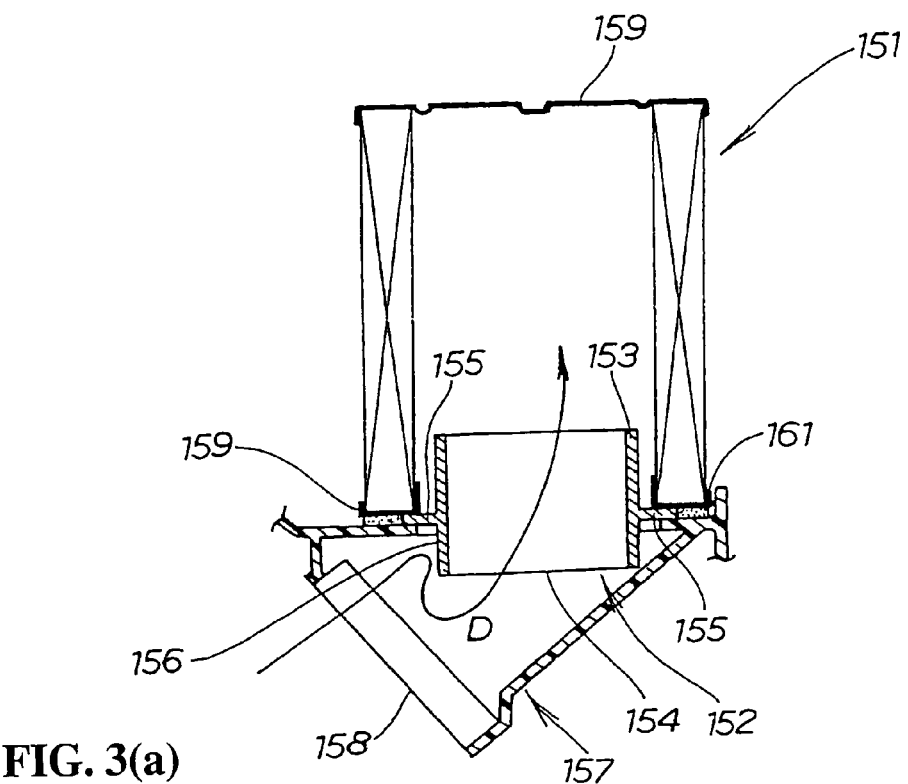
FIGS. 3(a) and 3(b) are views showing a comparison example and an embodiment of an inlet of a guide sleeve of an air guide member.
Figure 3B:
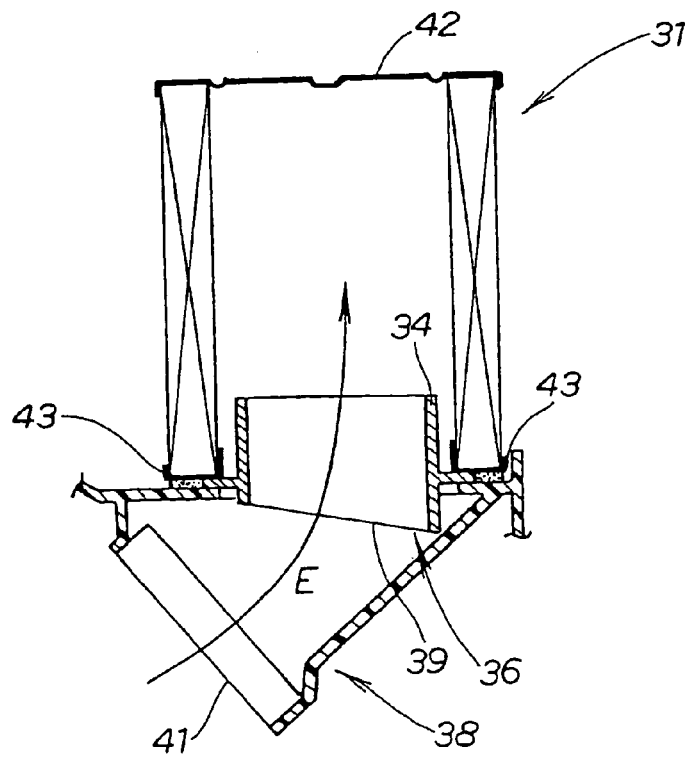

FIGS. 3(a) and 3(b) are views showing a comparison example and an embodiment of the inlet of the guide sleeve of the air guide member.

FIG. 3(a) shows the comparison example in which an air guide member 152 is coupled to an element 151 with an inlet 154 of a guide sleeve being perpendicular to a cylindrical side surface of the guide sleeve 153. The air guide member 152 is coupled to the element 151 by way of flange portions 155, 155.

A portion of air which enters as indicated by an arrow D from an inclined portion 158 of an air intake duct portion 157 impinges on a lower portion of the guide sleeve 156 and enters the inside of the element 31 in a zigzag manner.

FIG. 3(b) shows the embodiment in which the element 31 is integrally formed from the element upper lid 42 and the element lower lid 43. The element 31 can be securely fixed to the air guide member 36 and the air intake duct portion 38 by way of the flange portions 35, 35 (see FIG. 2) of the air guide member 36 which are coupled to ends 32, 32 (see FIG. 2) of the element lower lid 43 and the cushions 46, 46 (see FIG. 2).

Air enters from the inclined portion 41 of the air intake duct portion 38 as indicated by an arrow E and, thereafter, can smoothly enter the inside of the element 31 since the inlet 39 of the guide sleeve of the air guide member 36 is inclined in the direction substantially equal to the inclined portion 41.

Figure 4:
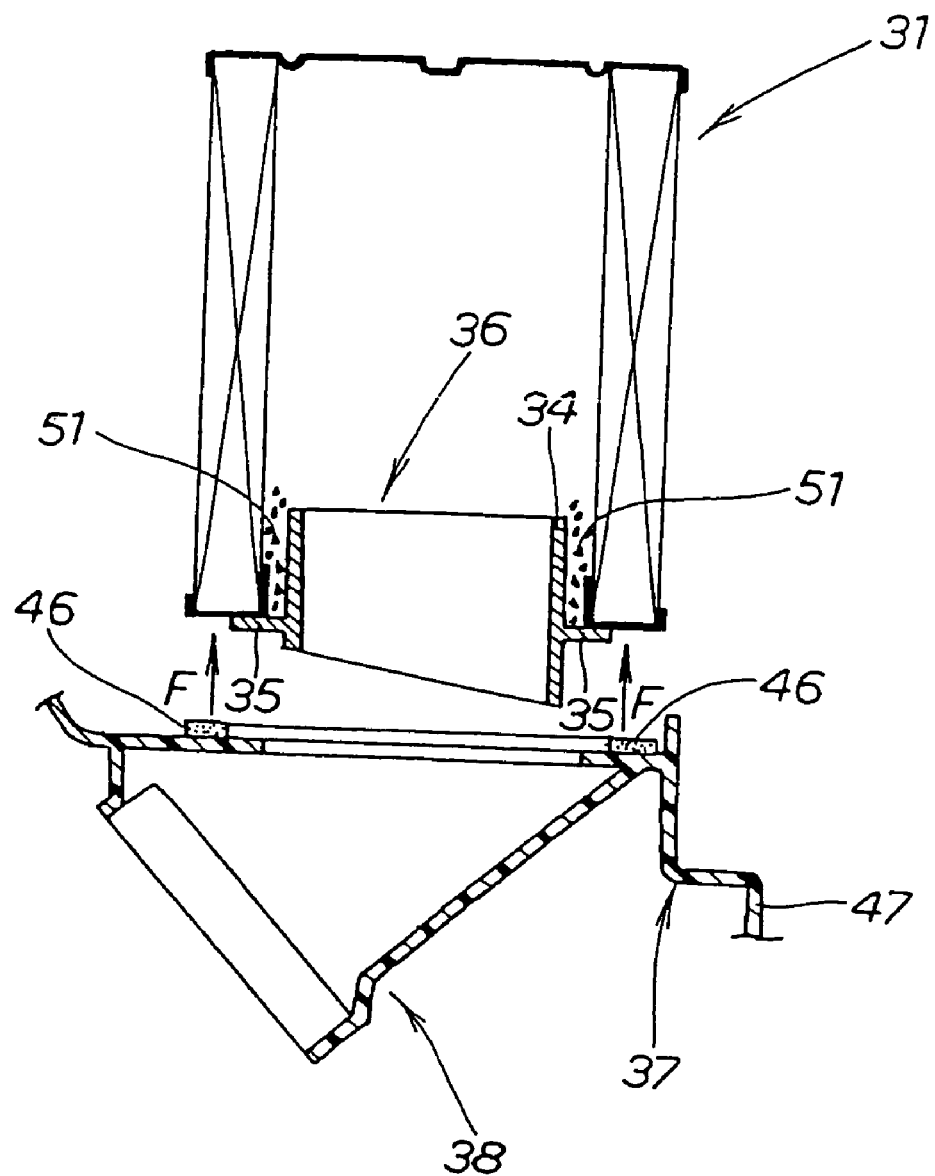
FIG. 4 is an operational view showing the manner of removing an element from a cleaner case at the time of exchanging the element.

FIG. 4 is an operational view showing the manner of removing the element from the cleaner case at the time of exchanging the element.

The element 31 is used in a state wherein the element 31 is coupled with the air guide member 36 by way of the flanges 35, 35. The exchange of the element 31 is performed by removing the flange portions 35, 35 of the air guide member 36 which are coupled to the element 31 from the cleaner case 37 and the cushions 46, 46 as indicated by an arrow F.

As a result, the coupled body formed of the element 31 and the air guide member 36 can be integrally taken out to the outside of the cleaner case 37 in a state wherein the dust and dirt 51 which are collected between the element 31 and the guide sleeve 34 hardly falls into the inside (so-called cleans side) of the cleaner case 37.

Figure 5A:
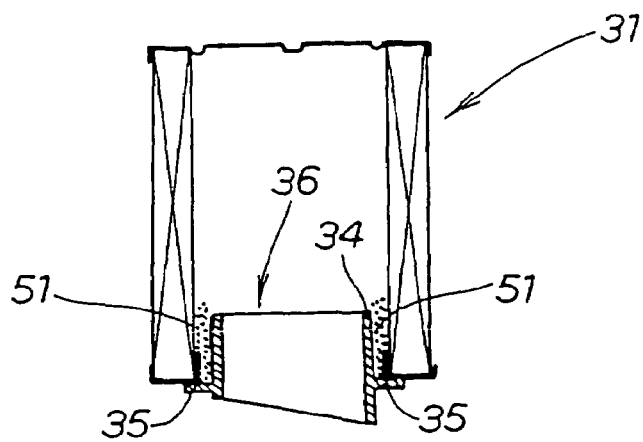
FIGS. 5(a), 5(b) and 5(c) are operational views showing the manner of exchanging the element taken out from the cleaner case with a new element.
Figure 5B:
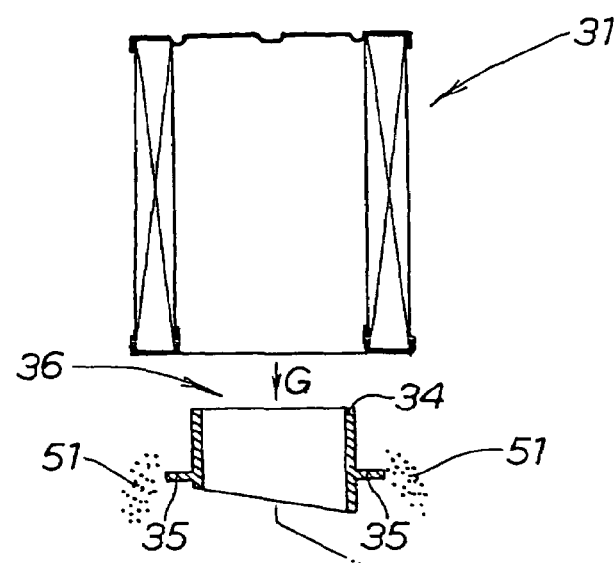
Figure 5C:
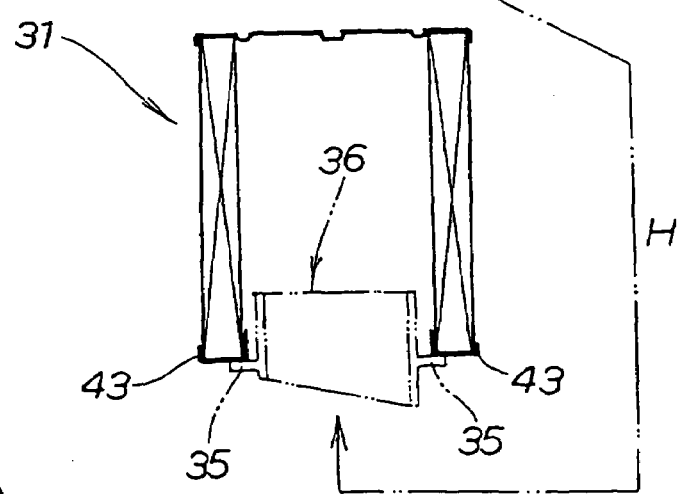
Figure 6A:
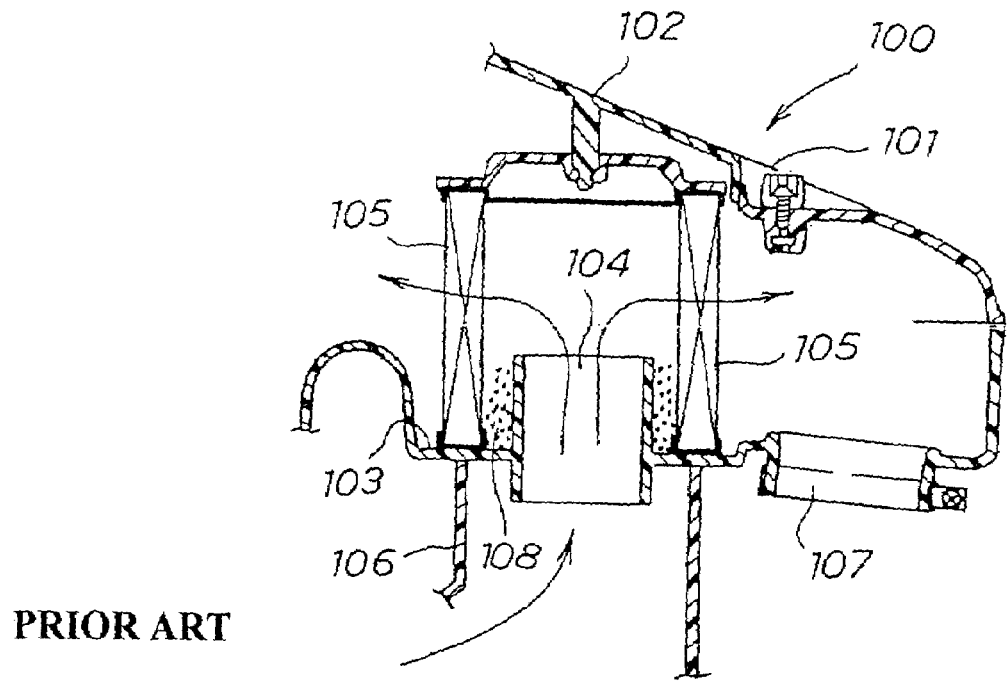
FIGS. 6(a) and 6(b) are views for explaining the basic principle of the prior art.
Figure 6B:
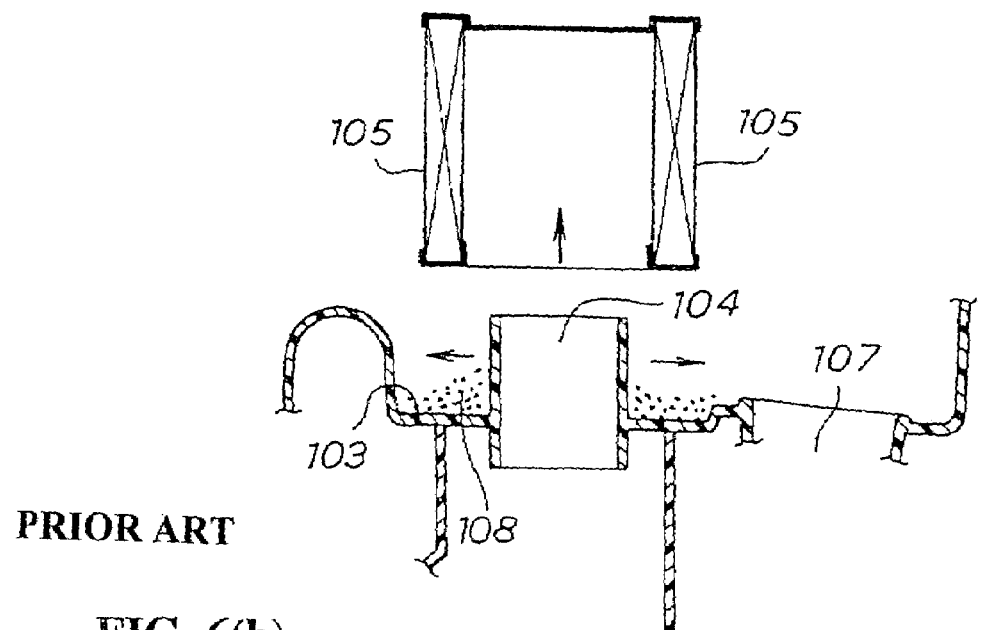

FIGS. 5(a) to 5(c) are operational views showing the manner of exchanging the element taken out from the cleaner case with a new element. FIG. 5(a) shows a state in which the coupled body of the element 31 and the air guide member 36 is taken out and is held in the cleaner case 37 (not shown) and the dust and dirt are collected between the element 31 and the guide sleeve 34.

FIG. 5(b) shows a state in which the element 31 and the air guide member 36 are removed from each other as indicated by an arrow G. After removing them from each other as shown in FIG. 5(b), the dirty element 31 is discarded and the air guide member 36 is cleaned by removing the dust and dirt from the air guide member 36.

FIG. 5(c) shows a state in which the cleaned air guide member 36 and the new element 31 are coupled with each other.

The coupling is performed by coupling the flange portions 35, 35 of the air guide member 36, as indicated by an arrow H, which is neatly cleaned after being removed in FIG. 5(b) to the element lower lids 43, 43 of the new element 31.

In this manner, the present invention has an advantageous effect wherein the element 31 and the air guide member 36 can be separated from each other, the dirty element 31 can be discarded, and the air guide member 36 can be cleaned and recycled.

In the air cleaner device of the present invention, a material for the air guide member 36 may be either resin or metal.

Further, the air guide member may be inseparable from the element.

The air cleaner device of the present invention can be preferably used in a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner device comprising:
a cylindrical element;
a releasable air guide member including a guide sleeve having a diameter smaller than an inner diameter of the cylindrical element for inserting the air guide member from one end of the cylindrical element;
flange portions formed on the guide sleeve for contacting one end surface of the cylindrical element; and
a cleaner case for housing the cylindrical element and the air guide member;
wherein the air guide member is coupled to the cylindrical element, and
wherein the air guide member is integrally formed with the cylindrical element at the time of detaching the cylindrical element from the cleaner case such that the air guide member is removed together with the cylindrical element, and is separably coupled to the cylindrical element when the air guide member is removed from the cleaner case.

2. The air cleaner device according to claim 1, wherein when an air intake duct portion having an axis which is inclined with respect to an axis of the cylindrical element is attached to the cleaner case, an inlet of the guide sleeve defines an inclined surface which is inclined in the same direction as the air intake duct portion.

3. The air cleaner device according to claim 1, and further including a lower portion of a guide sleeve extending a predetermined distance downwardly therefrom for causing air entering said air guide to assume a zigzag path.

4. The air cleaner device according to claim 1, and further including a lower portion of a guide sleeve extending substantially flush with said flange portion for causing air entering said air guide to assume a substantially straight path.

5. The air cleaner device according to claim 1, and further including a cushion member aligned with said flange portions for engaging a lower portion of said cylindrical element.

6. The air cleaner device according to claim 1, wherein said guide sleeve extends upwardly a predetermined distance from said flange portion for forming a space between an outer surface of said guide sleeve and an inter surface of said cylindrical element for trapping dirt and dust therein.

7. The air cleaner device according to claim 1, wherein when said cylindrical element is removed from the cleaner case and said air guide is dismounted relative thereto, dirt and dust can be removed from a space formed between the air guide and the element.

8. The air cleaner device according to claim 1, wherein said flange portion of said guide sleeve extend a predetermined distance from a central portion thereof and said one end of said cylindrical element extends a predetermined distance from the central portion that is greater relative to said predetermined distance of said guide sleeve for forming a space for accommodating a cushion member therein.

9. An air cleaner device comprising:
a filter element;
a releasable air guide member including a guide sleeve for inserting the air guide member into one end of the filter element;
flange portions formed on the guide sleeve for contacting the one end of the filter element; and
a cleaner case for housing the filter element and the air guide member;
wherein the air guide member is removably secured to the filter element,
wherein the air guide member is integrally formed with the cylindrical element at the time of detaching the cylindrical element from the cleaner case and is separably coupled to the cylindrical element when the air guide member is removed from the cleaner case such that the air guide member is removed together with the cylindrical element.

10. The air cleaner device according to claim 9, wherein when an air intake duct portion having an axis which is inclined with respect to an axis of the filter element is attached to the cleaner case, an inlet of the guide sleeve defines an inclined surface which is inclined in the same direction as the air intake duct portion.

11. The air cleaner device according to claim 9, and further including a lower portion of a guide sleeve extending a predetermined distance downwardly therefrom for causing air entering said air guide to assume a zigzag path.

12. The air cleaner device according to claim 9, and further including a lower portion of a guide sleeve extending substantially flush with said flange portion for causing air entering said air guide to assume a substantially straight path.

13. The air cleaner device according to claim 9, and further including a cushion member aligned with said flange portions for engaging a lower portion of said filter element.

14. The air cleaner device according to claim 9, wherein said guide sleeve extends upwardly a predetermined distance from said flange portion for forming a space between an outer surface of said guide sleeve and an inter surface of said filter element for trapping dirt and dust therein.

15. The air cleaner device according to claim 9, wherein when said filter element is removed from the cleaner case and said air guide is dismounted relative thereto, dirt and dust can be removed from a space formed between the air guide and the filter element.

16. The air cleaner device according to claim 9, wherein said flange portion of said guide sleeve extend a predetermined distance from a central portion thereof and said one end of said filter element extends a predetermined distance from the central portion that is greater relative to said predetermined distance of said guide sleeve for forming a space for accommodating a cushion member therein.

17. An air cleaner device comprising:
a cylindrical element;
an air guide member including a guide sleeve having a diameter smaller than an inner diameter of the cylindrical element for inserting the air guide member from one end of the cylindrical element;
flange portions formed on the guide sleeve for contacting one end surface of the cylindrical element; and
a cleaner case for housing the cylindrical element and the air guide member;
wherein the air guide member is coupled to the cylindrical element, and
wherein the flange portions are caught between the cylindrical element and an air intake duct portion of the air guide member.

18. The air cleaner device according to claim 17, wherein the air guide member is integrally formed with the cylindrical element at the time of detaching the cylindrical element from the cleaner case such that the air guide member is removed together with the cylindrical element, and is separably coupled to the cylindrical element when the air guide member is removed from the cleaner case.

19. The air cleaner device according to claim 17, wherein when the air intake duct portion having an axis which is inclined with respect to an axis of the cylindrical element is attached to the cleaner case, an inlet of the guide sleeve defines an inclined surface which is inclined in the same direction as the air intake duct portion.

* * * * *